(12) United States Patent
Acobas

(10) Patent No.: US 9,254,701 B2
(45) Date of Patent: Feb. 9, 2016

(54) UNDERBLANKET OF THE BLANKET OF A BLANKET CYLINDER OF A PRINTING PRESS, PARTICULARLY OF THE OFFSET TYPE

(75) Inventor: Roberto Levi Acobas, Milan (IT)

(73) Assignee: Printgraph Waterless S.p.A., Milanese (IT)

( * ) Notice: Subject to any disclaimer, the term of this patent is extended or adjusted under 35 U.S.C. 154(b) by 120 days.

(21) Appl. No.: 13/876,706

(22) PCT Filed: Jul. 29, 2011

(86) PCT No.: PCT/EP2011/063125
§ 371 (c)(1),
(2), (4) Date: Jul. 15, 2013

(87) PCT Pub. No.: WO2012/041568
PCT Pub. Date: Apr. 5, 2012

(65) Prior Publication Data
US 2013/0276650 A1    Oct. 24, 2013

(30) Foreign Application Priority Data
Sep. 30, 2010  (IT) .............................. MI2010A1795

(51) Int. Cl.
*B41N 1/04* (2006.01)
*B41N 10/04* (2006.01)
*B32B 27/40* (2006.01)

(52) U.S. Cl.
CPC .............. *B41N 10/04* (2013.01); *B32B 27/40* (2013.01); *B41N 2210/06* (2013.01); *B41N 2210/14* (2013.01)

(58) Field of Classification Search
CPC .............. B41N 10/04; B41N 2210/04; B41N 2210/06; B41N 2210/14; B41N 6/00; B32B 27/40

USPC ........................ 101/375, 368, 217; 428/423.1
See application file for complete search history.

(56) References Cited

U.S. PATENT DOCUMENTS

| | | | |
|---|---|---|---|
| 5,498,470 A * | 3/1996 | McLean et al. | 442/250 |
| 6,514,668 B1 * | 2/2003 | Tsuji et al. | 430/278.1 |
| 7,189,443 B2 * | 3/2007 | Levi Acobas | 428/40.1 |
| 2004/0096668 A1 * | 5/2004 | Peter et al. | 428/422.8 |
| 2005/0158563 A1 * | 7/2005 | Levi Abocas | 428/423.1 |
| 2005/0158564 A1 * | 7/2005 | Levi Acobas | 428/423.1 |
| 2008/0070042 A1 * | 3/2008 | Byers et al. | 428/423.1 |
| 2010/0199869 A1 * | 8/2010 | Levi Acobas et al. | 101/375 |
| 2011/0135899 A1 * | 6/2011 | Meltzer et al. | 428/217 |
| 2013/0276650 A1 * | 10/2013 | Acobas | 101/217 |

FOREIGN PATENT DOCUMENTS

| | | |
|---|---|---|
| EP | 1580022 | 9/2005 |
| WO | WO2008/036796 | 3/2008 |
| WO | WO 2009010123 A1 * | 1/2009 |
| WO | WO2010/017082 | 2/2010 |

OTHER PUBLICATIONS

International Search Report and Written Opinion; International Application No. PCT/EP2011/063125; International Filing Date: Jul. 29, 2011; 10 pages.
Priority Document No. MI2010A001795; International Patent Application No. PCT/EP2011/063125; International Filing Date: Jul. 29, 2011; 26 pages.

* cited by examiner

*Primary Examiner* — Matthew G Marini
*Assistant Examiner* — Leo T Hinze
(74) *Attorney, Agent, or Firm* — Blank Rome LLP

(57) ABSTRACT

An underblanket of the blanket of a blanket cylinder of a printing press, particularly of the offset type, consists of a multilayer structure comprising a first layer comprising at least one polyurethane-based material, and at least a second layer comprising at least one polyurethane-based material, which is different from the one forming said first layer, and directly joined with said first layer by exploiting the intrinsic chemical/physical compatibility.

9 Claims, No Drawings

UNDERBLANKET OF THE BLANKET OF A BLANKET CYLINDER OF A PRINTING PRESS, PARTICULARLY OF THE OFFSET TYPE

RELATED APPLICATIONS

This application is a U.S. national phase application of International Application No. PCT/EP2011/063124, having an international filing date of Jul. 29, 2011; which application claims benefit of priority of Italy Patent Application No. MI2010A 001795, filed Sep. 30, 2010.

The present invention relates to an underblanket of the blanket or rubber-coated fabric covering of a blanket cylinder of a printing press, particularly of the offset type.

The invention also relates to a blanket cylinder of a printing press, particularly of the offset type, which comprises a blanket having such an underblanket, and to a blanket cylinder which comprises such a blanket cylinder.

Schematically, an offset printing press consists of a plate cylinder, ink and dampening rollers, the above-mentioned blanket cylinder, and a counter-pressure cylinder. In this type of printing the image etched onto the plate is first transferred onto the blanket and from the latter onto a sheet of paper, or more in general onto the medium to be printed on.

Depending on the machine model, the manufacturer specifies the blanket cylinder diameter which is ideal in order for the machine itself to work correctly. This diameter is reached by interposing the underblanket between the blanket and blanket cylinder.

The underblanket is made with layers of various materials, mainly sheets of paper, fabrics spread with rubber and adhesive polyester sheets.

These underblankets as well are often not directly available in the desired thickness and several layers must be manually superimposed one on top of the other until the right thickness is obtained. This operation is rather long and requires attention, which makes changing a blanket a costly task.

Another limit of traditional underblankets is that they do not have mechanical characteristics such as to respond adequately to the mechanical stresses of the printing process.

In general, permanent deformations may occur which damage the printing quality and in the case of paper (widely used when large underblanket thicknesses are necessary) there is poor resistance to the washing and dampening products employed in the process, which imposes frequent replacements of the material.

Another patent of the same applicant (European patent EP 1323527) discloses the use of an underblanket comprising a series of sheets (for example of cardboard or a synthetic material such as polyurethane) joined together by a glue that allows the individual sheets to be removed in order to easily obtain the desired underblanket thickness.

Another patent, EP 1580022 (again of the applicant), instead discloses a self-levelling underblanket capable of responding adequately to the mechanical stresses of the process, improving the printing quality and reducing the costs associated with replacing blankets.

Said product consists of a polyurethane-based layer with elastic properties supported by a polyester layer, and is directly produced in the required thicknesses. In this solution, however, the interface between the two layers has a weak point. Over time, in fact, the infiltrations of washing and dampening solutions, combined with mechanical stresses, can lead to the peeling of the polyurethane layer from the substrate, resulting in possible problems in printing quality and the necessity of replacing the underblanket prematurely.

Peeling from the substrate may also be caused in some cases solely by the strong mechanical stresses that may occur due to problems typical of the printing process. For example it may occur that several sheets of paper/cardboard enter simultaneously between the blanket cylinder and the counter-pressure one (in jargon "smash") and this produces a strong mechanical stress both on the blanket and underblanket.

Moreover, said solution has disadvantages from a production standpoint, since specific costly pre-treatments of the polyester are necessary to ensure adequate adhesion between the two materials.

The technical task underlying the present invention is therefore to realize an underblanket for the blanket of a blanket cylinder of a printing press, particularly of the offset type, which can eliminate the lamented technical disadvantages of the prior art.

Within the framework of this technical task, one object of the invention is to realize an underblanket of the blanket of a blanket cylinder of a printing press, particularly of the offset type, which is immediately available in the desired thickness so as to simplify the change of blankets.

Another object of the invention is to realize an underblanket of the blanket of a blanket cylinder of a printing press, particularly of the offset type, which is resistant to the mechanical stresses it is subjected to during printing and to the washing products used for the blankets and plates, as well as the dampening products employed in the printing process, so as to last longer without its performance being penalized.

A further object of the invention is to realize an underblanket of the blanket of a blanket cylinder of a printing press, particularly of the offset type, which has a multilayer structure having high dimensional stability without the risk of peeling at the interface between the layers, and which is easy to produce.

The technical task, as well as these and other objects, are achieved according to the present invention by realizing an underblanket of the blanket of a blanket cylinder of a printing press, particularly of the offset type, characterised in that it consists of a multilayer structure comprising a first layer comprising at least one polyurethane-based material, and at least a second layer comprising at least one polyurethane-based material, which is different from the one forming said first layer, and directly joined with said first layer by exploiting the intrinsic chemical/physical compatibility between the polyurethane-based material present in the first and in the second layer.

Preferably said first and second layer have a different tensile modulus of elasticity. In a preferred embodiment of the invention, said first and/or said at least one second layer have organic and/or inorganic fillers added to them so as to obtain mechanical properties suitable for the intended use.

More in general, additives of varying nature may be used according to application needs, including expanding microspheres, or antistatic agents, etc.

In a preferred embodiment of the invention the underblanket has an overall thickness of between 0.1 mm and 2.0 mm.

The tolerance in the overall thickness dimension of the underblanket is less than or equal to 0.02 mm, preferably less than or equal to 0.01 mm.

In a preferred embodiment of the invention said polyurethane-based material of said first and/or at least a second layer is an aromatic polyurethane.

In another preferred embodiment of the invention, said polyurethane-based material of said first and/or at least a second layer is an aliphatic polyurethane.

In a preferred embodiment of the invention the underblanket consists exclusively of said first and second layer.

In a different preferred embodiment of the invention the underblanket consists exclusively of said first and at least second layer and of an adhesive layer applied to the surface of the first or second layer intended for contact with said cylinder.

In yet another preferred embodiment of the invention the underblanket comprises a succession of at least three layers comprising a polyurethane-based material, joined together by exploiting their chemical/physical compatibility.

The underblanket can be obtained by producing the different layers separately according to the known film production techniques, e.g. extrusion, calendaring, spreading, etc., and subsequently bonding the layers together directly by exploiting their chemical/physical compatibility.

Alternatively, the layers can be produced sequentially one upon the other, again according to the above-mentioned known techniques, or else the layers can be produced simultaneously using known co-extrusion techniques, or by means of a combination of the mentioned types of production.

The underblanket can be made completely or in part adhesive on the side in contact with the cylinder to facilitate the mounting thereof in some types of printing presses.

It has been possible to verify in particular that optimal results can be obtained when the polyurethane-based material of one of the two layers is a material having the following reference characteristics: E-modulus 2130 MPa+/−20% according to the test method of ISO527-2/1A/1.

In particular the polyurethane-based material is an extruded thermoplastic polyurethane.

Some examples of a preferred, but not exclusive, embodiment of the underblanket according to the invention are provided below.

EXAMPLE 1

A first 0.25 mm thick layer of a glass-fibre reinforced aromatic polyester-based polyurethane sold by the company Lubrizol under the name of ESTALOC 59003 is produced by extrusion. Said first layer is subsequently used as a substrate for the extrusion of a second 0.40 mm thick layer of aromatic polyester-based polyurethane sold by the company Merquinsa under the name of PEARLCOAT 127 K.

EXAMPLE 2

A first 0.35 mm thick layer of an aromatic polyester-based polyurethane sold by the company Lubrizol under the name of ETE 55DS3 is produced by extrusion. A second 0.7 mm thick layer of an aromatic polyester-based polyurethane sold by the company Lubrizol under the name of ESTANE 54620 is calandered directly onto said first layer.

EXAMPLE 3

A first 0.09 mm thick layer of the above-mentioned Lubrizol ETE 55DS3 is produced by extrusion. A second 0.038 mm thick layer of aromatic polyester-based polyurethane sold by the company Lubrizol under the name of ESTANE 54660 is applied by a spreading process to said first layer. Finally, an acrylic-based adhesive, suitable for adhesion to the cylinder and then subsequent removal, is applied by calendaring onto the side of the first layer in a thickness of 0.032 mm.

EXAMPLE 4

A first 0.35 mm thick layer of the above-mentioned ETE 55DS3 by Lubrizol is produced by extrusion. A second 0.65 mm thick layer of aromatic polyester-based polyurethane sold by the company Lubrizol under the name of ESTANE 54600 is subsequently applied to said first layer by a calendaring process. Finally, a third 0.3 mm thick layer of the above-mentioned ESTANE 54660 is applied by extrusion on the second side of the first layer of ETE 55DS3. A multilayer underblanket with an overall thickness of 1.3 mm is obtained.

EXAMPLE 5

A first 0.15 mm thick layer of ISOPLAST 2530 made by Lubrizol is produced by extrusion. One side of said first layer is subsequently used as a substrate for the extrusion of a second 0.85 mm thick layer of aromatic polyester-based polyurethane sold by the company Merquinsa under the name of PEARLCOAT 127 K. Finally, a 0.5 mm thick layer of ESTANE 54660 is applied by extrusion on the second side of the ISOPLAST 2530 film. A multilayer underblanket with an overall thickness of 1.5 mm is obtained.

By selecting the number, thickness and mechanical characteristics (tensile modulus of elasticity) of the polyurethane-based layers, it is possible to modify, in an extremely versatile manner, the overall mechanical properties of the underblanket in order to adapt it each time to the specific application so as to guarantee optimal printing quality combined with maximum resistance to peeling thanks to the perfect chemical/physical compatibility at the interface between the layers, which share the presence of polyurethane in the material making them up.

The underblanket of the blanket of a blanket cylinder of a printing press, particularly of the offset type, thus conceived is susceptible of numerous modifications and variants, all falling within the scope of the inventive concept; moreover, all the details may be replaced with other technically equivalent ones.

In practice, all of the materials used, as well as the dimensions, can be any whatsoever according to need and the state of the art.

The invention claimed is:

1. An underblanket of a blanket of a blanket cylinder of a printing press, the underblanket that is a multilayer structure consisting of:
    a first layer having a polyurethane-based material and
    a second layer having a polyurethane-based material different from the polyurethane-based material of the first layer, the second layer being directly joined with the first layer,
    wherein one of the first layer and the second layer is a polyurethane-based material having an E-modulus of 2130 MPa+/−20% according to ISO527.

2. The underblanket of claim 1, wherein the first layer and the second layer have a different tensile modulus of elasticity.

3. The underblanket of claim 1, wherein the polyurethane-based material of the first layer or of the second layer is an extruded thermoplastic polyurethane.

4. The underblanket of claim 1, wherein the underblanket has an overall thickness of between 0.1 mm and 2.0 mm.

5. The underblanket of claim 1, wherein the polyurethane-based material of the first or of the second layer is an aromatic polyurethane.

6. The underblanket of claim 1, wherein the polyurethane-based material of the first or the second layer is an aliphatic polyurethane.

7. A blanket cylinder of a printing press comprising
    a blanket having an underblanket that is a multilayer structure consisting of a first layer having a polyurethane-based material and a second layer having a polyurethane-based material different from the polyurethane-based material of the first layer, the second layer being directly joined with the first layer, wherein one of the first layer and the second layer is a polyurethane-based material having an E-modulus of 2130 MPa+/−20% according to ISO527.

8. A printing press comprising a blanket cylinder including a blanket having an underblanket that is a multilayer structure consisting of a first layer having a polyurethane-based material and a second layer having a polyurethane-based material different from the polyurethane-based material of the first layer, the second layer being directly joined with the first layer, wherein one of the first layer and the second layer is a polyurethane-based material having an E-modulus of 2130 MPa+/−20% according to ISO527.

9. An underblanket of a blanket of a blanket cylinder of a printing press, the underblanket that is a multilayer structure consisting of:
  a first layer having a polyurethane-based material and
  a second layer having a polyurethane-based material different from the polyurethane-based material of the first layer, the second layer being directly joined with the first layer,
  wherein one of the first layer and the second layer is a polyurethane-based material having an E-modulus of 2130 MPa+/−20% according to ISO527, and
  wherein the first or the second layer have organic or inorganic fillers.

* * * * *